United States Patent
Goldman et al.

(10) Patent No.: US 10,953,603 B2
(45) Date of Patent: Mar. 23, 2021

(54) METHODS, SYSTEMS, AND COMPUTER PROGRAM PRODUCTS FOR DETERMINING ORIENTATION AND FABRICATION PARAMETERS USED IN THREE-DIMENSIONAL (3D) CONTINUOUS LIQUID INTERFACE PRINTING (CLIP) SYSTEMS, AND RELATED PRINTERS

(71) Applicant: Carbon, Inc., Redwood City, CA (US)

(72) Inventors: Roy Goldman, Cupertino, CA (US); Craig B. Carlson, Los Altos, CA (US); Abhishek Parmar, Palo Alto, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 16/809,008

(22) Filed: Mar. 4, 2020

(65) Prior Publication Data
US 2020/0198245 A1 Jun. 25, 2020

Related U.S. Application Data

(63) Continuation of application No. 16/414,905, filed on May 17, 2019, now Pat. No. 10,611,087, which is a
(Continued)

(51) Int. Cl.
*B29C 64/386* (2017.01)
*B29C 64/135* (2017.01)
(Continued)

(52) U.S. Cl.
CPC .......... *B29C 64/386* (2017.08); *B29C 64/135* (2017.08); *B29K 2105/0002* (2013.01);
(Continued)

(58) Field of Classification Search
CPC .... B29C 64/386; B29C 64/106; B29C 64/135
See application file for complete search history.

(56) References Cited

U.S. PATENT DOCUMENTS

| 5,236,637 A | 8/1993 | Hull |
| 7,438,846 B2 | 10/2008 | John |

(Continued)

FOREIGN PATENT DOCUMENTS

| WO | 2014/210394 | 12/2014 |
| WO | 2015/020939 | 2/2015 |

(Continued)

OTHER PUBLICATIONS

Andrew et a. "Confining Light to Deep Subwavelength Dimensions to Enable Optical Nanopatterning" Science, 324 (5929):917-921 (2009).
(Continued)

*Primary Examiner* — Thomas L Dickey
(74) *Attorney, Agent, or Firm* — Myers Bigel, P.A

(57) ABSTRACT

A method of operating a Continuous Liquid Interface Printing (CLIP) printer can include receiving a set of objectives for fabrication of an object using a CLIP printer and determining an orientation for fabrication of the object based on fulfillment of the set of objectives by simulated fabrication of the object.

19 Claims, 8 Drawing Sheets

Related U.S. Application Data continuation of application No. 15/068,164, filed on Mar. 11, 2016, now Pat. No. 10,336,000.

(60) Provisional application No. 62/132,566, filed on Mar. 13, 2015, provisional application No. 62/132,673, filed on Mar. 13, 2015.

(51) Int. Cl.
    *B33Y 50/02*       (2015.01)
    *B33Y 10/00*       (2015.01)
    *B33Y 30/00*       (2015.01)
    *B29K 105/00*     (2006.01)

(52) U.S. Cl.
    CPC ....... *B29K 2105/0058* (2013.01); *B33Y 10/00* (2014.12); *B33Y 30/00* (2014.12); *B33Y 50/02* (2014.12); *G05B 2219/49023* (2013.01)

(56) References Cited

U.S. PATENT DOCUMENTS

| | | | |
|---|---|---|---|
| 7,892,474 B2 | 2/2011 | Shkolnik et al. | |
| 8,110,135 B2 | 2/2012 | El-Siblani | |
| 8,697,346 B2 | 4/2014 | McLeod et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 10,611,087 B2 * | 4/2020 | Goldman | B29C 64/386 |
| 2005/0181313 A1 | 8/2005 | Shih et al. | |
| 2010/0174392 A1 | 7/2010 | Fink et al. | |
| 2011/0260365 A1 | 10/2011 | El-Siblani | |
| 2013/0066812 A1 | 3/2013 | Nehme et al. | |
| 2013/0292862 A1 | 11/2013 | Joyce | |
| 2013/0295212 A1 | 11/2013 | Chen et al. | |
| 2015/0097315 A1 | 4/2015 | Desimone et al. | |
| 2015/0097316 A1 | 4/2015 | Desimone et al. | |
| 2015/0102532 A1 | 4/2015 | Desimone et al. | |
| 2015/0154321 A1 * | 6/2015 | Schmidt | B29C 64/386 700/98 |
| 2015/0331402 A1 | 11/2015 | Lin et al. | |
| 2015/0360419 A1 | 12/2015 | Willis et al. | |
| 2016/0059489 A1 | 3/2016 | Wang et al. | |

FOREIGN PATENT DOCUMENTS

| | | |
|---|---|---|
| WO | 2015/195909 | 12/2015 |
| WO | 2015/195920 | 12/2015 |
| WO | 2015/195924 | 12/2015 |
| WO | 2015/200173 | 12/2015 |
| WO | 2015/200179 | 12/2015 |
| WO | 2015/200189 | 12/2015 |
| WO | 2015/200201 | 12/2015 |
| WO | 2016/007495 | 1/2016 |
| WO | 2016/053512 | 4/2016 |

OTHER PUBLICATIONS

Hell et al. "Nanoscale Resolution with Focused Light: STED and Other RESOLFT Microscopy Concepts" Handbook of Biological Confocal Microscopy, 3d Ed. pp. 571-579 (2006)

Scott et al. "Two-Color Single-Photon Photoinitiation and Photoinhibition for Subdiffraction Photolithography", Science, 324(5929):913-917 (2009)

Tubleston et al. "Continuous Liquid Interface Production of 3D Objects" Science, 347(6228):1349-1352 (2015).

* cited by examiner

METHODS, SYSTEMS, AND COMPUTER PROGRAM PRODUCTS FOR DETERMINING ORIENTATION AND FABRICATION PARAMETERS USED IN THREE-DIMENSIONAL (3D) CONTINUOUS LIQUID INTERFACE PRINTING (CLIP) SYSTEMS, AND RELATED PRINTERS

CROSS-REFERENCE TO RELATED APPLICATIONS

This application is a continuation of Ser. No. 16/414,905, filed May 17, 2019, which claims priority to U.S. patent application Ser. No. 15/068,164, filed on Mar. 11, 2016, now U.S. Pat. No. 10,336,000, which in turn claims priority to U.S. Provisional Application No. 62/132,566, filed Mar. 13, 2015, and to U.S. Provisional Application No. 62/132,673, filed Mar. 13, 2015, and is related to U.S. Non-Provisional application Ser. No. 15/068,133, filed Mar. 11, 2016 the disclosures of all of which are incorporated herein by reference in their entireties.

FIELD

The present invention relates, generally, to the fabrication of three-dimensional objects and, more particularly, to additive printing of three-dimensional objects.

BACKGROUND

In some conventional additive fabrication techniques, construction of a three-dimensional object may be performed in a step-wise or layer-by-layer manner. For example, layers may be formed through solidification of a photo curable resin responsive to visible or UV light irradiation. One such known technique can provide new layers formed at the top surface of an object being fabricated. Another technique can provide new layers at the bottom surface of the object being fabricated.

Some examples of these approaches are discussed in U.S. Pat. Nos. 5,236,637, 7,438,846, 7,892,474, US Patent Publication No. 2013/0292862, and US Patent Publication No. 2013/0295212.

Another approach includes that used by the B9Creator™ 3D printer marketed by B9Creations of Deadwood, S. Dak., USA.

SUMMARY

Embodiments according to the invention can provide methods, systems, and computer program products for determining orientation and fabrication parameters used in three-dimensional (3D) Continuous Liquid Interface Printing (CLIP) systems, and related printers. A method of operating a CLIP printer can include receiving a set of objectives for fabrication of an object using a CLIP printer and determining an orientation for fabrication of the object based on fulfillment of the set of objectives by simulated fabrication of the object.

DETAILED DESCRIPTION OF EMBODIMENTS ACCORDING TO THE INVENTION

Figure 1A:
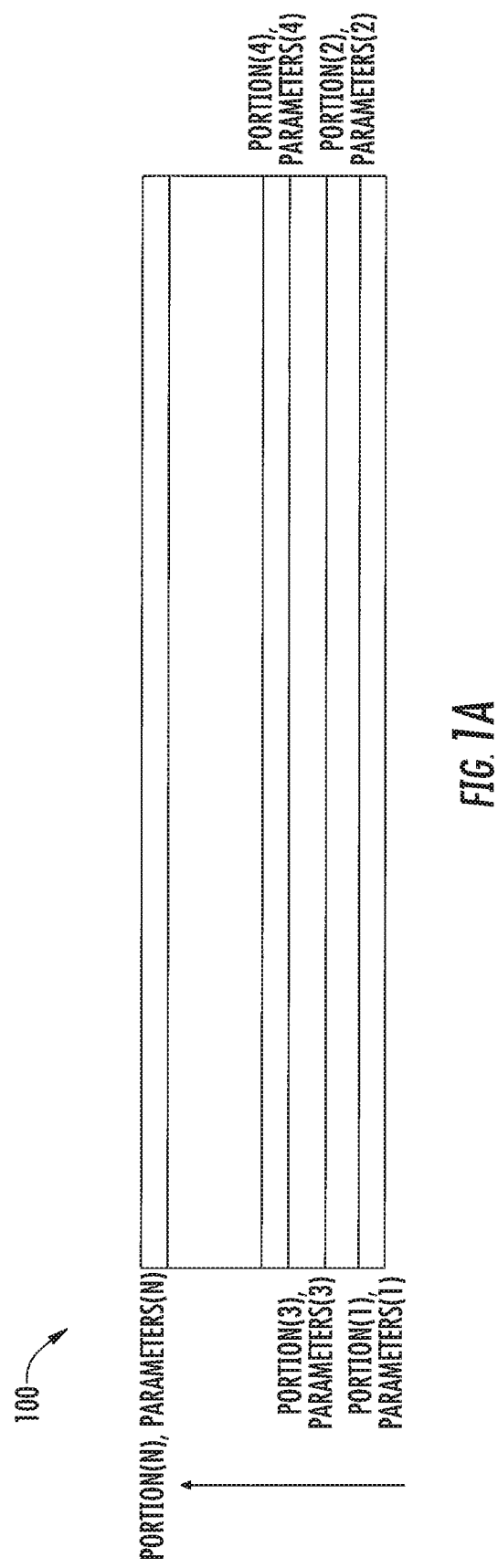
FIGS. 1A-1F are schematic diagrams of a 3D object in different orientations capable of being fabricated using a CLIP printer in some embodiments according to the invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. Like numbers refer to like elements throughout.

As described herein, while a variety of additive manufacturing methods and apparatus may be used, in some embodiments, the 3D objects can be produced using a liquid interface, which may be referred to as remote "Continuous Liquid Interface Printing" or "Continuous Liquid Interface Production" (CLIP), these terms being used interchangeably. It will be understood that in some embodiments according to the invention, the term "continuous" (or "continuously") can refer to the formation of at least some contiguous portions of the 3D object in situ. For example, in some embodiments according to the invention, different portions of the 3D object, which are contiguous with one another in the final 3D object, can both be formed sequentially within a gradient of polymerization. Furthermore, a first portion of the 3D object can remain in the gradient of polymerization while a second portion, that is contiguous with the first portion, is formed in the gradient of polymerization. Accordingly, the 3D object can be fabricated, grown or produced continuously from the gradient of polymerization (rather than fabricated in discrete layers).

CLIP may be carried out as a bottom-up three dimensional additive manufacturing technique. In general, bottom-up additive manufacturing may be carried out by: (a) providing a carrier and an optically transparent member having a build surface, said carrier and said build surface defining a build region therebetween; (b) filling said build region with a polymerizable liquid, said polymerizable liquid comprising a mixture of (i) a light (typically ultraviolet light) polymerizable liquid first component, and (ii) a second solidifiable component of the dual cure system; (c) irradiating said build region with light through said optically transparent member to form a solid polymer scaffold from said first component and also advancing said carrier away from said build surface to form a three-dimensional intermediate having the same shape as, or a shape to be imparted to, said three-dimensional object and containing said second solidifiable component (e.g., a second reactive component) carried in said scaffold in unsolidified and/or uncured form; and (d) concurrently with or subsequent to said irradiating step, solidifying and/or curing (e.g., further reacting, further polymerizing, further chain extending), said second solidifiable component (e.g., by heating and/or microwave irradiating) in said three-dimensional intermediate to form said three-dimensional object.

As noted above, the products are preferably formed by continuous liquid interface production (CLIP). CLIP is known and described in, for example, PCT Applications Nos. PCT/US2014/015486 (also published as US 2015/0102532); PCT/US2014/015506 (also published as US 2015/0097315), PCT/US2014/015497 (also published as US 2015/0097316), and in J. Tumbleston, D. Shirvanyants, N. Ermoshkin et al., Continuous liquid interface production of 3D Objects, Science 347, 1349-1352 (published online 16 Mar. 2015), all of which are hereby incorporated herein by reference. In some embodiments, CLIP employs features of a bottom-up three dimensional fabrication as described above, but the the irradiating and/or said advancing steps are carried out while also concurrently: (i) continuously maintaining a dead zone of polymerizable liquid in contact with said build surface, and (ii) continuously maintaining a gradient of polymerization zone (such as an active surface) between said dead zone and said solid polymer and in contact with each thereof, said gradient of polymerization zone comprising said first component in partially cured form. In some embodiments of CLIP, the optically transparent member comprises a semipermeable member (e.g., a fluoropolymer), and said continuously maintaining a dead zone is carried out by feeding an inhibitor of polymerization through said optically transparent member, thereby creating a gradient of inhibitor in said dead zone and optionally in at least a portion of said gradient of polymerization zone.

In some embodiments, CLIP may be carried out by optically establishing the dead zone and gradient of polymerization/active surface, such as by techniques explained in US Patent Application Publication No. US 2004/0181313 to Shih et al., in U.S. Pat. No. 8,697,346 to McLeod et al., S. Hell et al., Nanoscale Resolution with Focused Light: STED and Other RESOLFT Microscopy Concepts, in Handbook of Biological Confocal Microscopy (J. Pawley ed., 3d Ed. 2006); T. Andrew et al., Science, 324, 917-921 (2009); and T. Scott et al., Science 324, 913-917 (2009), all of which are hereby incorporated herein by reference. In such case, the window or build plate may be either semipermeable, or may be impermeable to an inhibitor of polymerization (e.g., a single glass sheet). In some embodiments, CLIP may be carried out by generating the inhibitor of polymerization electrochemically, such as by an optically transparent electrode or electrode array associated with the window or build plate, by which oxygen is electrochemically generated from water included in the polymerizable liquid. Again, in such case, the window or build plate may be either semipermeable (e.g., a fluoropolymer) or may be impermeable to an inhibitor of polymerization (e.g., a single glass sheet).

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes operating modes (that is, different manners of advancing the carrier and build surface away from one another), including continuous, intermittent, reciprocal, and combinations thereof.

Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.1 1, or 10 microns per second, up to about to 100, 1,000, or 10,000 microns per second, again depending again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

While CLIP is the preferred additive manufacturing technique for carrying out the present invention, it will be appreciated that other bottom-up or top-down additive manufacturing techniques, including ink-jet printer techniques, may also be used. Such methods are known and described in, for example, U.S. Pat. No. 5,236,637 to Hull, U.S. Pat. No. 7,438,846 to John, U.S. Pat. No. 8,110,135 to El-Siblani, and U.S. Patent Application Publication Nos. 2013/0292862 to Joyce and 2013/0295212 to Chen et al. The disclosures of these patents and applications are incorporated by reference herein in their entireties.

Additional examples of apparatus, polymerizable liquids (or "resins"), and methods that may be used in carrying out the present invention include, but are not limited to, those set forth in J. DeSimone et al., Three-Dimensional Printing Using Tiled Light Engines, PCT Publication No. WO/2015/195909 (published 23 Dec. 2015); J. DeSimone et al., Three-Dimensional Printing Method Using Increased Light Intensity and Apparatus Therefore, PCT Publication No.

WO/2015/195920 (published 23 Dec. 2015), A. Ermoshkin et al., Three-Dimensional Printing with Reciprocal Feeding of Polymerizable Liquid, PCT Publication No. WO/2015/195924 (published 23 Dec. 2015); J. Rolland et al., Method of Producing Polyurethane Three-Dimensional Objects from Materials having Multiple Mechanisms of Hardening, PCT Publication No. WO 2015/200179 (published 30 Dec. 2015); J. Rolland et al., Methods of Producing Three-Dimensional Objects from Materials Having Multiple Mechanisms of Hardening, PCT Publication No. WO 2015/200173 (published 30 Dec. 2015); J. Rolland et al., Three-Dimensional Objects Produced from Materials Having Multiple Mechanisms of Hardening, PCT Publication No. WO/2015/200189 (published 30 Dec. 2015); J. Rolland et al., Polyurethane Resins Having Multiple Mechanisms of Hardening for Use in Producing Three-Dimensional Objects published 30 Dec. 2015); and J. DeSimone et al., Methods and Apparatus for Continuous Liquid Interface Production with Rotation, PCT Publication No. WO/2016/007495, the disclosures of which are incorporated by reference herein in their entirety.

In an alternate embodiment of the invention, the methods may be carried out with a method and apparatus as described in Hull, U.S. Pat. No. 5,236,637, at FIG. 4, where the polymerizable liquid is floated on top of an immiscible liquid layer (said to be "non-wetting" therein). Here, the immiscible liquid layer serves as the build surface. If so implemented, the immiscible liquid (which may be aqueous or non-aqueous) preferably: (i) has a density greater than the polymerizable liquid, (ii) is immiscible with the polymerizable liquid, and (iii) is wettable with the polymerizable liquid. Ingredients such as surfactants, wetting agents, viscosity-enhancing agents, pigments, and particles may optionally be included in either or both of the polymerizable liquid or immiscible liquid.

While the present invention is preferably carried out by continuous liquid interphase polymerization, as described in detail above, in some embodiments alternate methods and apparatus for bottom-up three-dimension fabrication may be used, including layer-by-layer fabrication. Examples of such methods and apparatus include, but are not limited to, those described U.S. Pat. No. 7,438,846 to John and U.S. Pat. No. 8,110,135 to El-Siblani, and in U.S. Patent Application Publication Nos. 2013/0292862 to Joyce and 2013/0295212 to Chen et al. The disclosures of these patents and applications are incorporated by reference herein in their entirety.

The fabrication of 3D objects is also described in U.S. Pat. Nos. 9,216,546; 9,211,678; and 9,205,601, the contents of all of which are hereby incorporated herein by reference.

Figure 1B:
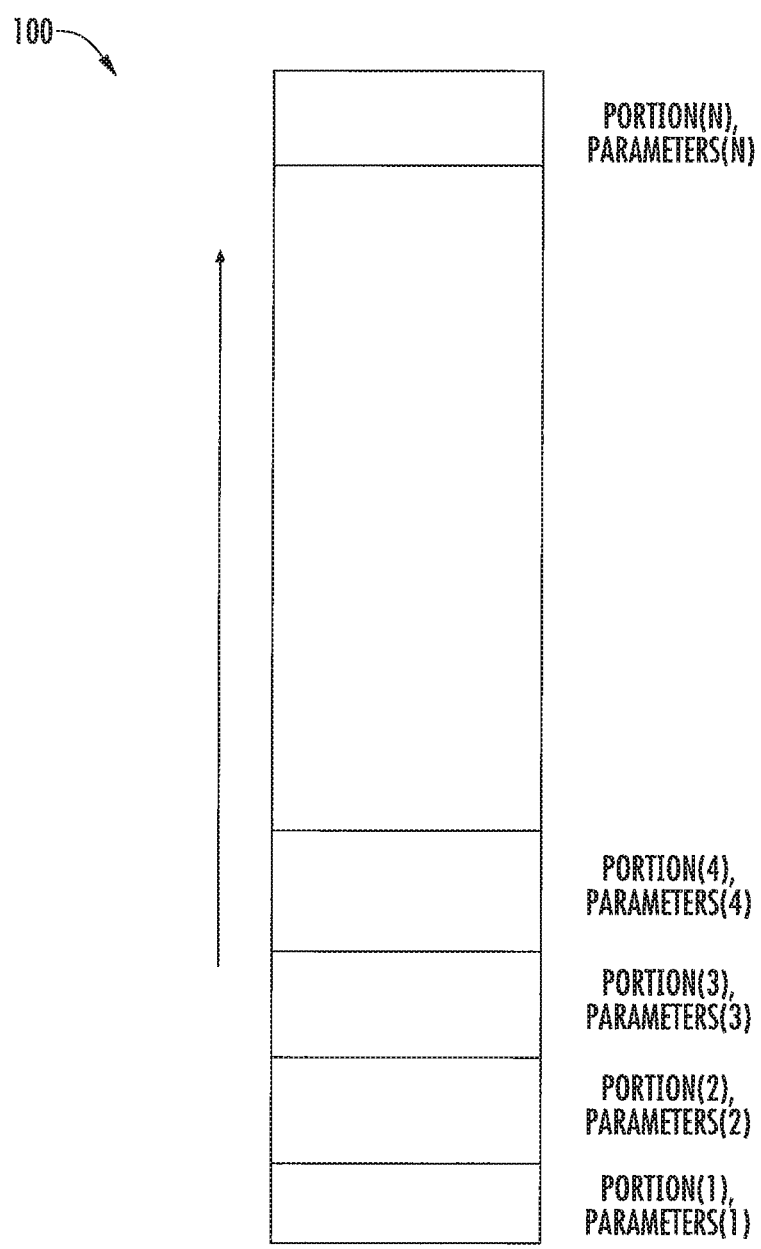
Figure 1C:
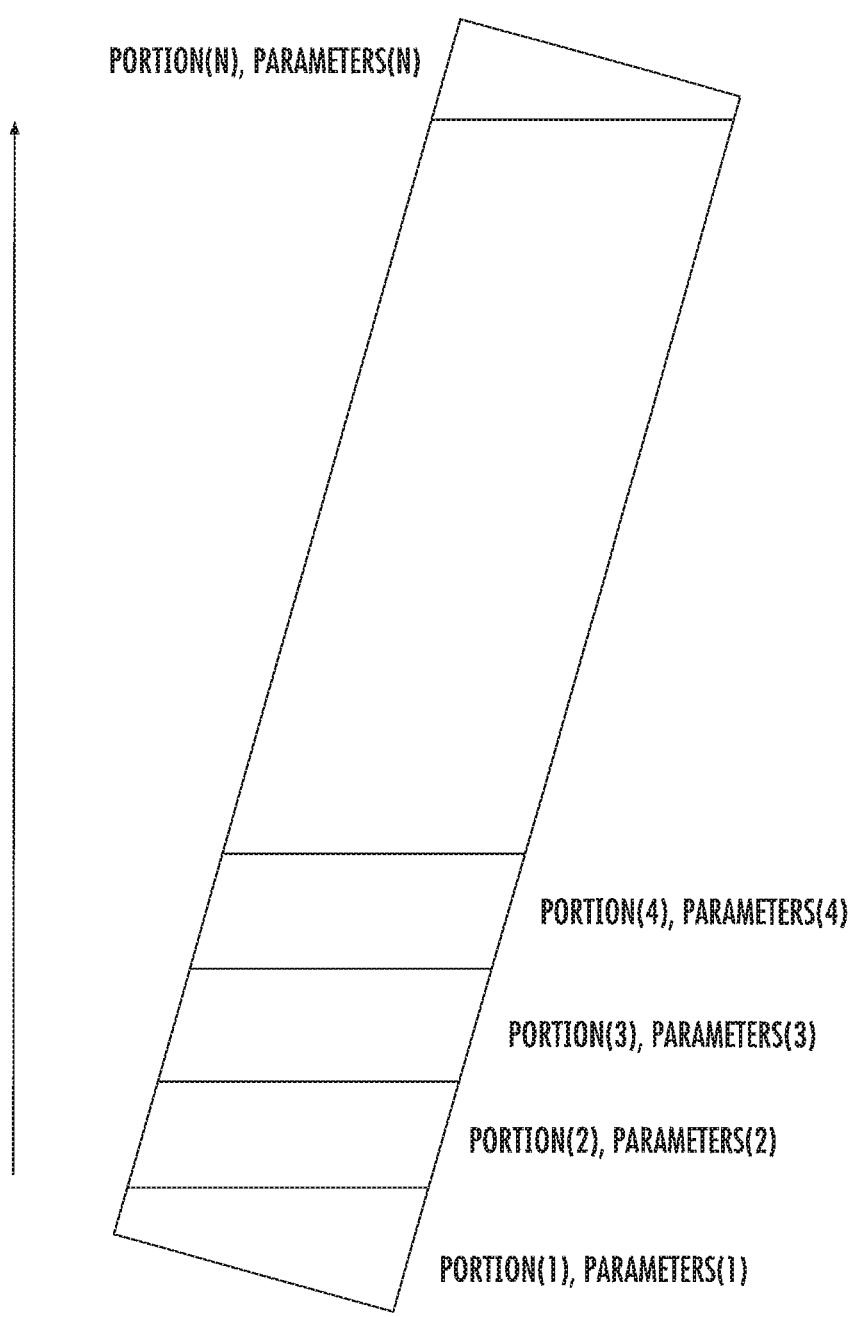

FIGS. 1A-1C are schematic diagrams of a 3D object in different orientations capable of being fabricated using a CLIP printer in some embodiments according to the invention. According to FIGS. 1A-1C, the 3D object 100 can be represented as a collection of contiguous Portions 1-N of the 3D object 100. The contiguous Portions 1-N can directly correspond (1:1) to respective Slices S1-SN of a data set representing the 3D object 100. The Portions 1-N can, however, correspond to an arbitrary number of Slices of the data set and to an arbitrary thickness of the slices of the 3D object 100. In other words, the Slices of the data set can represent different Portions having different thicknesses in the 3D object 100.

Figure 1D:
Figure 1E:
Figure 1F:
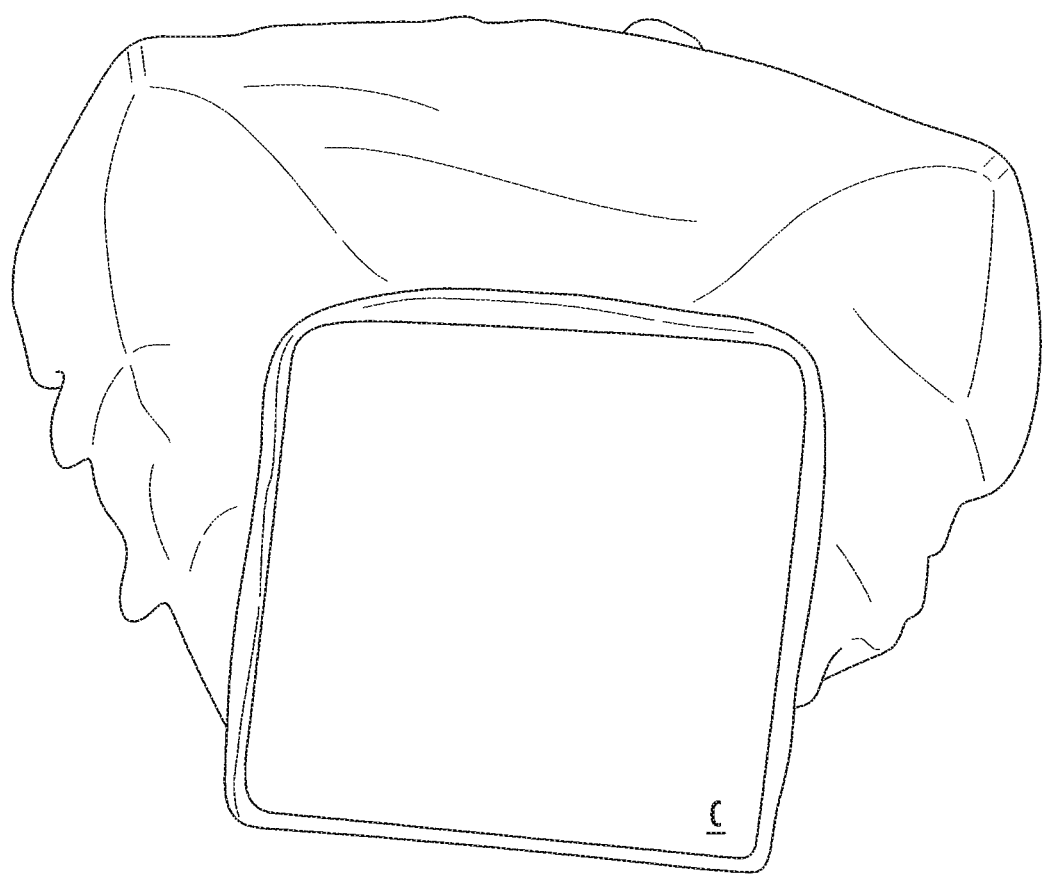

It will be understood that the Portions 1-N can represent a 3D volume of the object 100. In other words, the Portions 1-N can each represent a length, width, and height of a 3D sub-region within the 3D object 100. In particular, sub-regions of the Portions 1-N can include an interior sub-regions of the object 100 and surfaces of the Portion 1-N. Accordingly, FIGS. 1D-1F show a realistic rendering of a 3D object 200 where the Portions within the object 200 are more independent of slices of data and the orientation for the object 200. For example, a Portion A on the object 200 in FIG. 1D includes a "face" surface of the object 200, whereas a Portion B in FIG. 1E includes a "back" surface of the object 200, and FIG. 1F includes a "base" surface of the object 200. It will be understood that each of the Portions A, B, and C of the object 200 can be identified before a particular orientation is chose (or simulated) for fabrication of the object 200.

It will be further understood that the Portions A, B, and C can have different priorities objectives. For example, the face" surface of the object 200, may have an objective indicating that surface fineness is a relatively high priority. In contrast, the "back" and "base" surfaces of the object 200, may be lower priority for surface fineness, but may have a relatively high priority for mechanical strength. Still further, the face" surface of the object 200 may also have an associated objective to restrict an augmentation (such as structural supports, whereas the "back" and "base" surfaces of the object 200, may have objectives that allow for some degree of augmentation.

As shown in FIG. 1A, a first orientation can represent a "landscape" orientation for the 3D fabrication, whereas FIG. 1B represents a "portrait" orientation for the 3D fabrication, and FIG. 1C represents an orientation between the landscape orientation and the portrait orientation. It will be understood that other orientations may also be used.

Each of the orientations shown in FIGS. 1A-1C represents a candidate orientation for the fabrication of the 3D object 100. Each of the Portions shown for the different orientations corresponds to a different physical Portion of the 3D object 100 depending upon which orientation is represented. Still further, each of the Parameter sets associated with a respective Portion also represents what can be a unique set of Parameters used for printing that Portion in the orientation. Accordingly, despite the similarities in the nomenclature between FIGS. 1A-1C, the Portions may be different from one another and the Parameters used to print those Portions may also be different from one another.

As appreciated by the present inventors, the orientation selected for the fabrication of a particular 3D object can have a significant effect on a set of objectives which characterize the desired results for the highlighted Portions of the object. For example, in some embodiments, the landscape orientation of the 3D object 100 shown in FIG. 1A can provide different fabrication results (measured against a set of objectives for the fabrication) compared to the other orientations shown in FIGS. 1B and 1C. Accordingly, in some embodiments, the orientation which meets the set of objectives provided by a user can be selected for fabrication of the 3D object 200.

As further shown in FIGS. 1A-1C, each of the Portions 1-N can have an associated set of Parameters applied to the CLIP printer for fabrication of the 3D object 100. In other words, each of the Portions 1-N can have a respective set of Parameters such that the Parameters applied to the CLIP printer can vary depending on the Portion of the 3D object 100 currently being fabricated. For example, when the first Portion (1) is being fabricated, the set of Parameters (1) is applied to the CLIP printer. When, however, the next contiguous Portion (2) is to be fabricated, the set of Parameters (2) can be applied to the CLIP printer. It will be understood that each of the sets of the Parameters 1-N can be different or can be repeated. For example, in some cases the sets of Parameters (1-10) may be the same as one another whereas in other cases each of the sets of Parameters (1-10) may be different from one another. Also, a complete schedule of Parameters 1-N can be maintained for a particular orientation of the 3D object, which are applied in sequence once fabrication begins.

Figure 2:
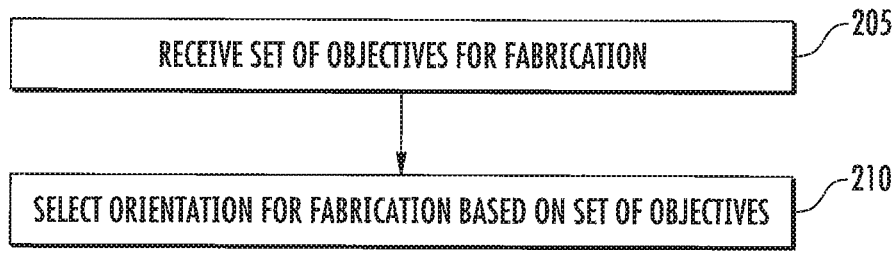
FIG. 2 is a flowchart illustrating operations of a system for determining an orientation used for fabrication of the 3D object of FIGS. 1A-1F using a CLIP printer in some embodiments according to the invention.

FIG. 2 is a flowchart illustrating operations of a system for determining the orientation used for fabrication of the 3D object 100 of FIGS. 1A-1F using a CLIP printer in some embodiments according to the invention. According to FIG. 2, the system can receive an set of objectives for the 3D fabrication of the object 200 as input (205). The set of objective inputs can include, for example, the mechanical characteristics associated with the Portions A, B, and C of the object 200 to be fabricated (for example, certain mechanical characteristics provided these different Portions by the object 200 including interior sub-regions of those Portions A, B, and C), the surface finish of the Portions A, B, and C (such as fine, medium, or rough), the accuracy of the Portions A, B, and C (versus the model used to fabricate the object 100), the degree to which augmentation/modification of the Portions A, B, and C of the 3D object 200 is affected as a result of 3D fabrication (such as the degree to which supports, holds, or other facets of the fabricated 3D object 200 may be added to the Portions A, B, and C due to the fabrication rather than due to the data corresponding to the 3D object 100), the speed at which the 3D object 200 is to be fabricated, the degree to which wear on the printing window is allowed given, for example, historical tracking of printer usage. For example, wear may include chemical "fouling" and/or mechanical delamination of the window due to excessive printing within a particular region of the window. The window wear may be tracked for example using an identifier associated with the window so that the print history of the window may be accessed despite the removal of the window from one printer and the installation of the window in another printer. The set of objective inputs can further include, for example, the degree to which other 3D objects may be simultaneously accommodated for along with the object 200 within printing window. Other objective inputs can also be included. Accordingly, each of the objective inputs included in the set can affect the fabrication differently depending on which orientation is used given the objectives associated with the Portions A, B, and C. For example, in some embodiments according to the invention, the set of objectives can be utilized to fabricate the 3D object 200 quickly compared to other orientations or to have a particularly fine finish compared to other orientations.

It will be also understood that the individual objectives within the set can be weighted relative to one another in accordance with the overall objective to be achieved. For example, in some embodiments, speed may be more heavily weighted than other objectives in the set. Still further, in some embodiments, each of the objectives in the set may be weighted equally. Other relative weightings of the objectives can be used based on the desired result for the 3D fabrication of the object 200. In some embodiments, the set of objectives (or the weighting of the different objectives) can vary with the Portions of the object 200. For example, in a first portion speed may be most important whereas in a second portion accuracy may be foremost.

In operation, the different orientations shown in FIGS. 1A-1C can yield very different results (for fabrication) based on the objectives for the Portions A, B, and C in the set as well as the weighting associated with each of the objectives in the set. Accordingly, the set of objectives (and the weighting) can be used to evaluate simulated results of fabrication for each orientation whereupon an orientation which meets the objectives included in the set can be selected for fabrication of the object 200 (210). For example, if the objective of fineness of surface finish is deemed to be the most important of all the objectives, it may be found that the orientation shown in FIG. 1C provides better surface finish compared to the other orientations, which would indicate that the FIG. 1C orientation should be used to fabricate the object 200 given the set of objectives (and weighting) provided. It will be understood that other objective inputs and/or weighting can, however, lead to a different orientation being selected for fabrication.

Figure 3:
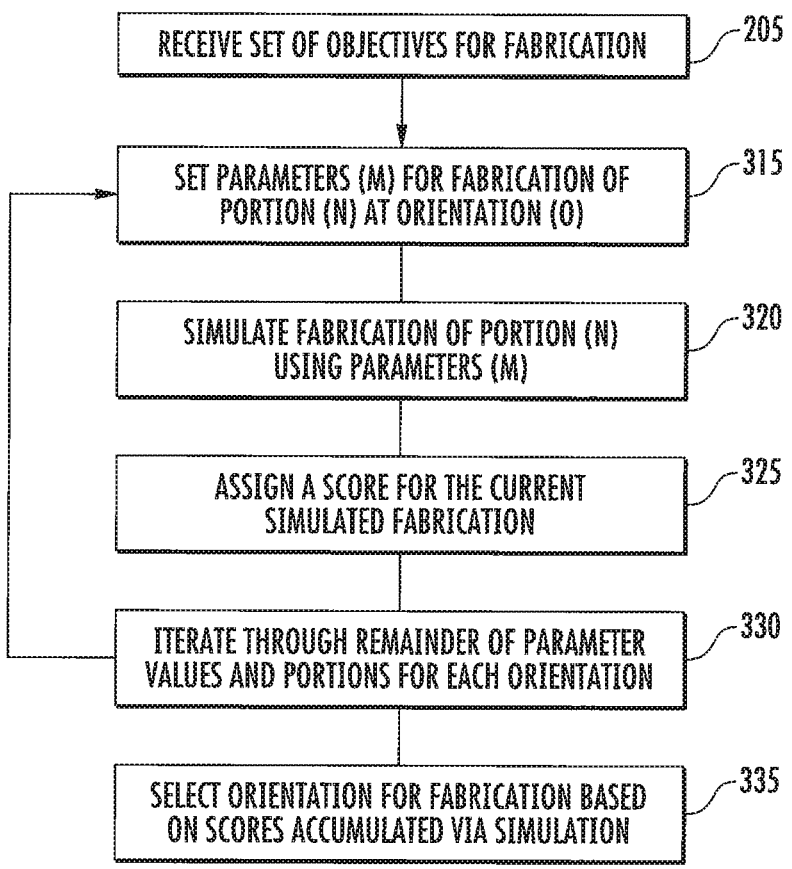
FIG. 3 is a flowchart illustrating operations of the system in FIG. 2 to determine the orientation and Parameters used to fabricate the 3D object of FIG. 1A-1F using simulation in some embodiments according to the invention.

FIG. 3 is a flowchart illustrating operations of the system in FIG. 2 to determine the orientation and Parameters to be used for fabrication of the 3D object 100 of FIGS. 1A-1F using simulation in some embodiments according to the invention. According to FIG. 3, the set of objectives (and weighting of the those objectives relative to one another) for the Portions A, B, and C are received (205). Also, an indication of the relative importance of the different portions (portion weighting) of the 3D object 100 can be provided. The portion weighting can specify, for example, that certain ones of the Portions A, B, and C of the object 200 may be relatively important to fabricate with a fine surface finish such that the Parameters to be used for fabricating that particular portion may be changed.

To simulate the fabrication of the 3D object 200, a first orientation (O) can be selected to identify a particular orientation, a first set of Parameter values can be selected where the set of Parameter (P) values may possibly be applied to the CLIP printer for the fabrication of the 3D object 200, and the particular Portion 1_N of the 3D object 100 can be selected (315). In some embodiments according to the invention, a simulation of fabrication can be carried out for each Orientation, set of Parameter values, and Portions 1-N, each of which can be scored relative to the set of objectives provided (205). It will be understood that in some embodiments, the Orientation, Parameters values, and Portions 1-N can be iterated through until all combinations are scored. In some embodiments, other techniques can be used to select fewer candidates for simulation and scoring.

It will be understood that the set of Parameters values (M) for fabrication associated with the Portion (N) can be a set of Parameter values associated with processes in the CLIP printer that can be monitored and/or controlled during fabrication. For example, the Parameters in the set can include values of the energy/frequency of the irradiation used to image the Portion, the temperature of the polymerizable liquid used to fabricate the 3D object 200, etc.

Accordingly, a range of values for each of the Parameters in the set can be used to simulate the fabrication of the Portion 1-N. For example, when the Parameter is temperature to be varied for the purposes of simulation, the other Parameter values in the set can be held constant while the temperature value can be changed during each simulation for the respective Portion (N). When, however, the Parameter to be varied is changed to the energy/frequency of the irradiation used, the temperature value can be held constant whereas value of the energy/frequency (over a certain range) is changed during successive simulations (320) for the same Portion (N).

The fabrication of the Portion (N) can be simulated using the current Orientation and set of Parameters (M) (320). It will be understood that the simulation of the fabrication of Portions of the 3D object 100 using the set of Parameter values can be provided using the relationships described in Tumbleston "Continuous Liquid InterPhase Printing of 3D Objects" Science Magazine March 2015, the entirety of which is included herewith.

It will be understood that a score can be assigned to each iteration of the simulation to indicate the degree to which the fabrication at the current orientation meets the set of objectives provided for the Portions A, B, and C (325). The score associated with the current simulation result is then recorded for later comparison with other scores generated using other Orientations and sets of Parameters values for the same portions.

The Orientation, Parameters values, and Portions 1-N can be iterated through (330) until all combinations are scored. The orientation which meets the set of Objectives and the assigned weighting can be selected based on the scores assigned to the different simulations (335).

Figure 4:
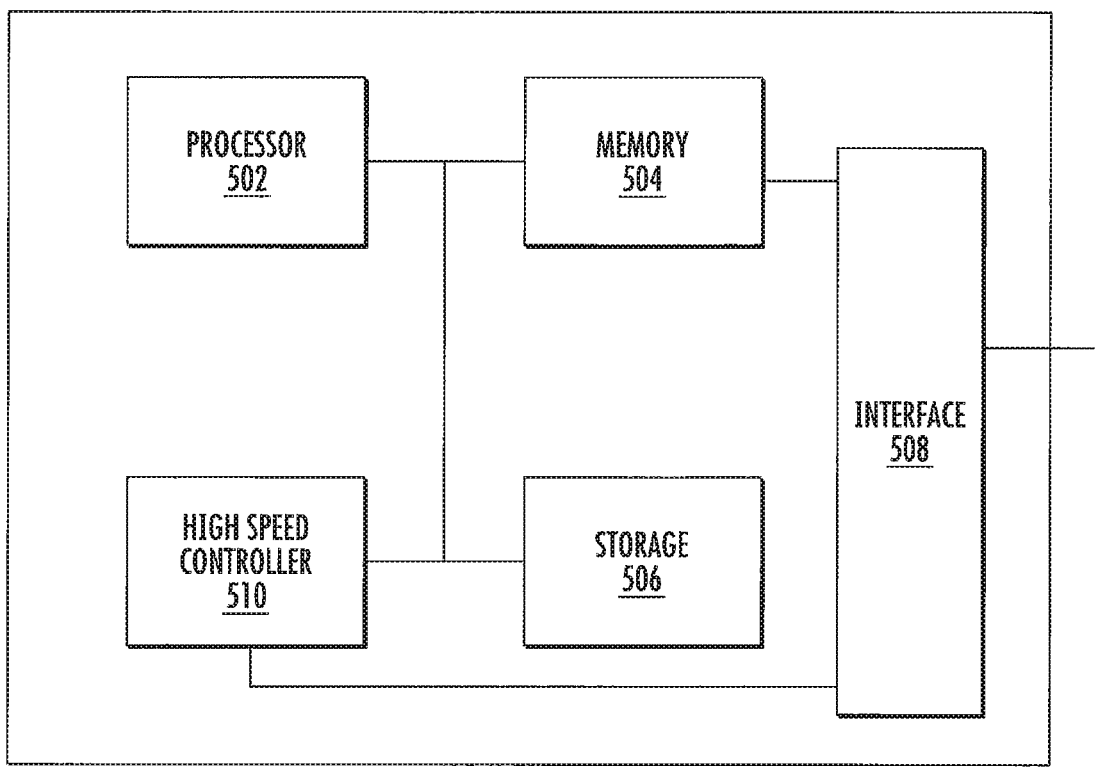
FIG. 4 is a block diagram of a computing device suitable for use in some embodiments according to the invention.

FIG. 4 shows an example of a generic computing device 500, which may be used with the embodiments described herein. Computing device 500 is intended to represent various forms of digital computers, such as laptops, desktops, workstations, personal digital assistants, servers, blade servers, mainframes, controllers, and other appropriate computers. The components shown herein, their connections and relationships, and their functions, are meant to be exemplary only, and are not meant to limit implementations of the inventions described and/or claimed.

Computing device 500 includes a processor 502, memory 504, a storage device 506, a high-speed interface 508 connected to memory 504, and a high speed controller 510. Each of the components, is interconnected using various buses, and may be mounted on a common motherboard or in other manners as appropriate. The processor 502 can process instructions for execution within the computing device 500, including instructions stored in the memory 504 or on the storage device 506 to display graphical information for a GUI on an external input/output device. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502. The high speed controller 510 can manage bandwidth-intensive operations for the computing device 500. Such allocation of functions is exemplary only.

The computing device 500 may be implemented in a number of different forms. For example, it may be implemented as a standard server, or multiple times in a group of such servers. It may also be implemented as part of a rack server system. In addition, it may be implemented in a personal computer such as a laptop computer. Alternatively, components of computing device 500 may be combined with other components.

It will be understood that various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, steps, operations, elements components and/or groups or combinations thereof, but do not preclude the presence or addition of one or more other features, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the Figures are schematic in nature and their shapes are not intended to illustrate the actual shape of a region of a device and are not intended to limit the scope of the inventive subject matter.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

]These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

In the drawings and specification, there have been disclosed typical embodiments of the inventive subject matter and, although specific terms are employed, they are used in a generic and descriptive sense only and not for purposes of limitation.

What is claimed:

1. A computer system comprising:
   a processor;
   a storage device;
   a memory coupled to the processor and comprising computer readable program code that when executed by the processor causes the processor to perform operations comprising:
   receiving a first set of control instructions for controlling a configuration of a Continuous Liquid Interface Printing (CLIP) printer to fabricate a three-dimensional (3D) object;
   for each orientation of a plurality of orientations of the 3D object, performing a plurality of simulations of a simulated fabrication of a first portion and a second portion of the 3D object using different parameter values from a plurality of parameter values for each simulation;
   selecting a fabrication orientation from among the plurality of orientations for a fabrication of the 3D object responsive to a determination that at least one simulation of the plurality of simulations achieves a set of objectives for the fabrication of the 3D object using the CLIP printer, wherein the set of objectives comprises a first objective for the first portion of the 3D object and a second objective, different from the first objective, for the second portion of the 3D object;
   modifying the first set of control instructions to generate a second set of control instructions for controlling the configuration of the CLIP printer to fabricate the 3D object, wherein the second set of control instructions comprises the fabrication orientation; and
   controlling the CLIP printer to fabricate the 3D object using the second set of control instructions.

2. The computer system of claim 1, wherein the parameter values comprise a first parameter value that is selected for the first portion of the 3D object and a second parameter value, different from the first parameter value, that is selected for the second portion of the 3D object, and
   wherein the second set of control instructions further comprises the first parameter value and the second parameter value.

3. The computer system of claim 1, wherein the set of objectives for fabrication comprises at least one mechanical characteristic of the 3D object, a surface finish of the 3D object, an indicator of accuracy of the 3D object as fabricated relative to data used to fabricate the 3D object, a degree to which augmentation/modification of the 3D object is affected as a result of fabrication, a speed at which the 3D object is to be fabricated, wear on a printing window of the CLIP printer, and/or a degree to which other 3D objects can be simultaneously fabricated with the 3D object.

4. The computer system of claim 1, wherein selecting the fabrication orientation for fabrication of the 3D object comprises simulating fabrication of the 3D object at different orientations of the plurality of orientations to provide a respective score for each of the different orientations.

5. A method comprising:
   receiving a first set of control instructions for controlling a configuration of a Continuous Liquid Interface Printing (CLIP) printer to fabricate a three-dimensional (3D) object;
   performing a plurality of simulations of a simulated fabrication of respective ones of a plurality of portions of the 3D object using a different subset of parameters from a plurality of parameters for each simulation;
   selecting a first parameter of the plurality of parameters for fabrication of a first portion of the 3D object and a second parameter of the plurality of parameters, different from the first parameter, for fabrication of a second portion of the 3D object responsive to a determination that at least one simulation of the plurality of simulations achieves a set of objectives for fabrication of the 3D object using the CLIP printer; and
   modifying the first set of control instructions to generate a second set of control instructions for controlling the configuration of the CLIP printer, wherein the second set of control instructions comprises the first parameter and the second parameter; and
   fabricating the 3D object by the CLIP printer using the second set of control instructions.

6. The method of claim 5, wherein the set of objectives comprises a first objective for the first portion of the 3D object and a second objective, different from the first objective, for the second portion of the 3D object.

7. The method of claim 5, further comprising selecting a fabrication orientation from among a plurality of orientations for fabrication of the 3D object responsive to the determination that the at least one simulation of the plurality of simulations achieves the set of objectives for fabrication of the 3D object using the CLIP printer,
   wherein the second set of control instructions comprises the fabrication orientation.

8. The method of claim 7, wherein the fabrication orientation is a second fabrication orientation, and
   wherein the first set of control instructions comprises a first fabrication orientation for the 3D object that is different from the second fabrication orientation.

9. The method of claim 8, wherein fabricating the 3D object comprises fabricating the 3D object by the CLIP printer at the fabrication orientation.

10. The method of claim 5, wherein the set of objectives for fabrication comprises at least one mechanical characteristic of the 3D object, a surface finish of the 3D object, an indicator of accuracy of the 3D object as fabricated relative to data used to fabricate the 3D object, a degree to which augmentation/modification of the 3D object is affected as a result of fabrication, a speed at which the 3D object is to be fabricated, wear on a printing window of the CLIP printer, and/or a degree to which other 3D objects can be simultaneously fabricated with the 3D object.

11. The method of claim 5, wherein selecting the first parameter of the plurality of parameters for fabrication of the first portion of the 3D object comprises simulating fabrication of the first portion of the 3D object at different parameters of the plurality of parameters to provide a respective score for each of the different parameters for the first portion and comparing the respective scores to determine the first parameter.

12. The method of claim 5, wherein the plurality of parameters comprise energy and frequency of irradiation used for fabricating the 3D object and/or a temperature of a polymerizable liquid used for fabricating the 3D object.

13. The method of claim 5, wherein the set of objectives for fabrication further comprises an indication of weighting of respective ones of the set of objectives.

14. A computer system comprising:
a processor;
a storage device;
a memory coupled to the processor and comprising computer readable program code that when executed by the processor causes the processor to perform operations comprising:
receiving a first set of control instructions for controlling a configuration of an additive manufacturing apparatus to fabricate a three-dimensional (3D) object;
performing a plurality of simulations of a simulated fabrication of respective ones of a plurality of portions of the 3D object using a different subset of parameters from a plurality of parameters for each simulation;
selecting a first parameter of the plurality of parameters for fabrication of a first portion of the 3D object and a second parameter of the plurality of parameters, different from the first parameter, for fabrication of a second portion of the 3D object responsive to a determination that at least one simulation of the plurality of simulations achieves a set of objectives for fabrication of the 3D object using the additive manufacturing apparatus;
modifying the first set of control instructions to generate a second set of control instructions for controlling the configuration of the additive manufacturing apparatus, wherein the second set of control instructions comprises the first parameter and the second parameter; and
controlling the additive manufacturing apparatus according to the second set of control instructions to fabricate the 3D object.

15. The computer system of claim 14, wherein the additive manufacturing apparatus is a Continuous Liquid Interface Printing (CLIP) printer.

16. The computer system of claim 14, wherein the processor is further configured to interface with the additive manufacturing apparatus to provide the second set of control instructions to fabricate the 3D object.

17. The computer system of claim 14, wherein the set of objectives comprises a first objective for the first portion of the 3D object and a second objective, different from the first objective, for the second portion of the 3D object.

18. The computer system of claim 14, further comprising selecting a fabrication orientation from among a plurality of orientations for fabrication of the 3D object responsive to the determination that the at least one simulation of the plurality of simulations achieves the set of objectives for fabrication of the 3D object using the additive manufacturing apparatus,
wherein the second set of control instructions comprises the fabrication orientation.

19. The computer system of claim 18, wherein the fabrication orientation is a second fabrication orientation, and
wherein the first set of control instructions comprises a first fabrication orientation for the 3D object that is different from the second fabrication orientation.

* * * * *